United States Patent
Singh et al.

(10) Patent No.: US 10,503,904 B1
(45) Date of Patent: Dec. 10, 2019

(54) RANSOMWARE DETECTION AND MITIGATION

(71) Applicant: FireEye, Inc., Milpitas, CA (US)

(72) Inventors: Japneet Singh, Bangalore (IN); Anil Gupta, Bangalore (IN)

(73) Assignee: FireEye, Inc., Milpitas, CA (US)

( * ) Notice: Subject to any disclaimer, the term of this patent is extended or adjusted under 35 U.S.C. 154(b) by 175 days.

(21) Appl. No.: 15/658,278

(22) Filed: Jul. 24, 2017

Related U.S. Application Data

(60) Provisional application No. 62/526,958, filed on Jun. 29, 2017.

(51) Int. Cl.
*G06F 21/00* (2013.01)
*G06F 21/56* (2013.01)
*G06F 21/55* (2013.01)

(52) U.S. Cl.
CPC .......... *G06F 21/565* (2013.01); *G06F 21/554* (2013.01); *G06F 21/561* (2013.01); *G06F 21/566* (2013.01); *G06F 21/568* (2013.01)

(58) Field of Classification Search
None
See application file for complete search history.

(56) References Cited

U.S. PATENT DOCUMENTS

| 4,292,580 A | 9/1981 | Ott et al. |
|---|---|---|
| 5,175,732 A | 12/1992 | Hendel et al. |
| 5,319,776 A | 6/1994 | Hile et al. |
| 5,440,723 A | 8/1995 | Arnold et al. |
| 5,483,621 A | 1/1996 | Ohtaka |
| 5,490,249 A | 2/1996 | Miller |

(Continued)

FOREIGN PATENT DOCUMENTS

| CN | 1545023 A | 11/2004 |
|---|---|---|
| GB | 2439806 A | 1/2008 |

(Continued)

OTHER PUBLICATIONS

Zorn, et.al, Nozzle "A Defense Against Heap-spraying Code Injection Attacks", Microsoft Research [online], Nov. 2008. Retrieved from the internet<URL: http://research.microsoft.com/apps/pubs/default.aspx?id=76528>.

(Continued)

*Primary Examiner* — Maung T Lwin
(74) *Attorney, Agent, or Firm* — Rutan & Tucker, LLP

(57) ABSTRACT

A computerized method for detecting and mitigating a ransomware attack is described. The method features (i) a kernel mode agent that intercepts an initiation of a process, intercepts one or more system calls made by the process when the process is determined to be suspicious and copies at least a portion of a protected file to a secure storage location when a request to open a protected file by the process is intercepted when the process is determined to be suspicious, and (ii) a user mode agent that determines whether the process is a suspicious process, monitors processing of the suspicious process and determines whether the suspicious process is associated with a ransomware attack. Additionally, in order to mitigate effects of a ransomware attack, the kernel mode agent may restore the protected file with a copy stored in the secure storage location when a ransomware attack is detected.

21 Claims, 9 Drawing Sheets

(56) References Cited

U.S. PATENT DOCUMENTS

| | | |
|---|---|---|
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,118,382 A | 9/2000 | Hibbs et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,196,205 B2 | 6/2012 | Gribble et al. |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,402,541 B2 | 3/2013 | Craioveanu et al. |
| 8,464,340 B2 | 6/2013 | Ahn et al. |
| 8,479,174 B2 | 7/2013 | Chiriac |

(56) References Cited

U.S. PATENT DOCUMENTS

| | | |
|---|---|---|
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 * | 8/2013 | Ranadive ............ H04L 63/1433 713/187 |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,788,785 B1 | 7/2014 | Mann |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,202,054 B1 | 12/2015 | Lu et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,317,686 B1 * | 4/2016 | Ye ..................... G06F 11/1461 |
| 9,336,386 B1 | 5/2016 | Qu et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,548,990 B2 | 1/2017 | Lu et al. |
| 9,560,059 B1 | 1/2017 | Islam |
| 9,565,202 B1 | 2/2017 | Kindlund et al. |
| 9,584,550 B2 | 2/2017 | Qu et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,804,800 B2 | 10/2017 | Livne et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |

(56) References Cited

U.S. PATENT DOCUMENTS

| | | |
|---|---|---|
| 9,888,019 B1 | 2/2018 | Pidathala et al. |
| 9,904,792 B1 | 2/2018 | Badishi et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Glide et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |

(56) References Cited

U.S. PATENT DOCUMENTS

| | | |
|---|---|---|
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0181227 A1 | 7/2008 | Todd |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0165131 A1 | 6/2009 | Treadwell |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0031359 A1 | 2/2010 | Alme |
| 2010/0037033 A1 | 2/2010 | Karecha et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0205674 A1 | 8/2010 | Zorn et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |

(56) References Cited

U.S. PATENT DOCUMENTS

| | | |
|---|---|---|
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0144486 A1 | 6/2012 | Navaraj et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0317570 A1 | 12/2012 | Dalcher et al. |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0123283 A1 | 5/2014 | Liu |
| 2014/0123284 A1 | 5/2014 | Liu |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0245444 A1 | 8/2014 | Lutas et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0344932 A1 | 11/2014 | Polychronakis et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0128266 A1 | 5/2015 | Tosa |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004861 A1 | 1/2016 | Momot |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0112446 A1 | 4/2016 | Lu et al. |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0231961 A1 | 8/2016 | Shin et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0328560 A1 | 11/2016 | Momot |
| 2016/0335110 A1 | 11/2016 | Paithane et al. |
| 2016/0358670 A1 | 12/2016 | Son et al. |
| 2016/0378988 A1* | 12/2016 | Bhaskar .............. G06F 21/566 726/24 |
| 2017/0083703 A1 | 3/2017 | Abbasi et al. |
| 2017/0091070 A1 | 3/2017 | Denise et al. |
| 2017/0098476 A1 | 4/2017 | Hong |
| 2017/0140156 A1* | 5/2017 | Gu ....................... G06F 11/1451 |
| 2017/0180394 A1* | 6/2017 | Crofton ................. H04L 63/145 |
| 2017/0364681 A1* | 12/2017 | Roguine .............. G06F 21/554 |
| 2018/0013770 A1 | 1/2018 | Ismael |
| 2018/0048660 A1 | 2/2018 | Paithane et al. |
| 2018/0075234 A1* | 3/2018 | Boutnaru .............. G06F 21/554 |
| 2018/0102902 A1* | 4/2018 | Yang .................... G06F 21/602 |
| 2018/0121316 A1 | 5/2018 | Ismael et al. |
| 2018/0203997 A1* | 7/2018 | Charters ............... G06F 21/568 |
| 2018/0278647 A1* | 9/2018 | Gabaev ............... H04L 63/1466 |
| 2018/0288077 A1 | 10/2018 | Siddiqui et al. |
| 2018/0357416 A1* | 12/2018 | Ashkenazi .......... G06F 21/6209 |

FOREIGN PATENT DOCUMENTS

| | | |
|---|---|---|
| GB | 2490431 A | 10/2012 |
| WO | 0206928 A2 | 1/2002 |
| WO | 02/23805 A2 | 3/2002 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

Leading Colleges Select FireEye to Stop Malware-Related Data Breaches, FireEye Inc., 2009.

(56) References Cited

OTHER PUBLICATIONS

Li et al., A VMM-Based System Call Interposition Framework for Program Monitoring, Dec. 2010, IEEE 16th International Conference on Parallel and Distributed Systems, pp. 706-711.
Liljenstam, Michael, et al., "Simulating Realistic Network Traffic for Worm Warning System Design and Testing", Institute for Security Technology studies, Dartmouth College ("Liljenstam"), (Oct. 27, 2003).
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].
Marchette, David J., "Computer Intrusion Detection and Network Monitoring: A Statistical Viewpoint", ("Marchette"), (2001).
Margolis, P.E., "Random House Webster's 'Computer & Internet Dictionary 3rd Edition'", ISBN 0375703519, (Dec. 1998).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFS 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Newsome, J., et al., "Polygraph: Automatically Generating Signatures for Polymorphic Worms", In Proceedings of the IEEE Symposium on Security and Privacy, (May 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.
Rahman, Mahmud Ab; Getting Owned by Malicious PDF—Analysis; 2010, SANS Institute, pp. 1-39.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Spitzner, Lance, "Honeypots: Tracking Hackers", ("Spizner"), (Sep. 17, 2002).
The Sniffers's Guide to Raw Traffic available at: yuba.stanford.edu/.about.casado/pcap/section1.html, (Jan. 6, 2014).
Thomas H. Ptacek, and Timothy N. Newsham, "Insertion, Evasion, and Denial of Service: Eluding Network Intrusion Detection", Secure Networks, ("Ptacek"), (Jan. 1998).
U.S. Appl. No. 14/311,000, filed Jun. 20, 2014 Advisory Action dated May 10, 2016.
U.S. Appl. No. 14/311,000, filed Jun. 20, 2014 Advisory Action dated Sep. 7, 2017.
U.S. Appl. No. 14/311,000, filed Jun. 20, 2014 Final Office Action dated Feb. 24, 2016.
U.S. Appl. No. 14/311,000, filed Jun. 20, 2014 Final Office Action dated May 18, 2017.
U.S. Appl. No. 14/311,000, filed Jun. 20, 2014 Non-Final Office Action dated Aug. 13, 2015.
U.S. Appl. No. 14/311,000, filed Jun. 20, 2014 Non-Final Office Action dated Nov. 3, 2016.
U.S. Appl. No. 14/311,000, filed Jun. 20, 2014 Notice of Allowance dated Jan. 12, 2018.
U.S. Appl. No. 14/311,014, filed Jun. 20, 2014 Advisory Action dated Apr. 29, 2016.
U.S. Appl. No. 14/311,014, filed Jun. 20, 2014 Final Rejection dated Mar. 24, 2016.
U.S. Appl. No. 14/311,014, filed Jun. 20, 2014 Non-Final Rejection dated Jul. 2, 2015.
U.S. Appl. No. 14/311,014, filed Jun. 20, 2014 Notice of Allowance dated Dec. 5, 2016.
U.S. Appl. No. 14/311,014, filed Jun. 20, 2014 Notice of Allowance dated Jan. 4, 2017.
U.S. Appl. No. 14/311,035, filed Jun. 20, 2014 Non-Final Office Action dated Jul. 6, 2015.
U.S. Appl. No. 14/311,035, filed Jun. 20, 2014 Notice of Allowance dated Jun. 24, 2016.
U.S. Appl. No. 14/311,035, filed Jun. 20, 2014 Notice of Allowance dated May 13, 2016.
U.S. Appl. No. 15/258,993, filed Sep. 7, 2016 Final Office Action dated Dec. 31, 2018.
U.S. Appl. No. 15/258,993, filed Sep. 7, 2016 Non-Final Office Action dated Aug. 16, 2018.
U.S. Appl. No. 15/258,993, filed Sep. 7, 2016 Notice of Allowance dated May 13, 2019.
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Venezia, Paul, "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
"Mining Specification of Malicious Behavior"—Jha et al, UCSB, Sep. 2007 https://www.cs.ucsb.edu/.about.chris/research/doc/esec07.sub.--mining.pdf-.
"Network Security: NetDetector—Network Intrusion Forensic System (NIFS) Whitepaper", ("NetDetector Whitepaper"), (2003).
"Packet", Microsoft Computer Dictionary, Microsoft Press, (Mar. 2002), 1 page.
"When Virtual is Better Than Real", IEEExplore Digital Library, available at, http://ieeexplore.ieee.org/xpl/articleDetails.iso?reload=true&arnumber=990073, (Dec. 7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye") (Sep. 2003).

(56) References Cited

OTHER PUBLICATIONS

AltaVista Advanced Search Results. "attack vector identifier". Http://www.altavista.com/web/results?Itag=ody&pg=aq&aqmode=aqa=Event+Orch- estrator . . . , (Accessed on Sep. 15, 2009).
AltaVista Advanced Search Results. "Event Orchestrator". Http://www.altavista.com/web/results?Itag=ody&pg=aq&aqmode=aqa=Event+Orch- esrator . . . , (Accessed on Sep. 3, 2009).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlaq Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cisco, Configuring the Catalyst Switched Port Analyzer (SPAN) ("Cisco"), (1992).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Crandall, J.R. , et al., "Minos:Control Data Attack Prevention Orthogonal to Memory Model", 37th International Symposium on Microarchitecture, Portland, Oregon, (Dec. 2004).
Deutsch, P. , "Zlib compressed data format specification version 3.3" RFC 1950, (1996).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).

Filiol, Eric , et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Hjelmvik, Erik , "Passive Network Security Analysis with NetworkMiner", (IN)Secure, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King") (2003).
Krasnyansky, Max , et al. Universal TUN/TAP driver, available at https://www.kernel.org/doc/Documentation/networking/tuntap.txt (2002) ("Krasnyansky").
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.

\* cited by examiner

RANSOMWARE DETECTION AND MITIGATION

CROSS-REFERENCE TO RELATED APPLICATIONS

This application claims the benefit of priority to U.S. Provisional Application No. 62/526,958, filed Jun. 29, 2017, the entire contents of which are incorporated by reference herein.

FIELD

Embodiments of the disclosure relate to the field of cybersecurity. More specifically, one embodiment of the disclosure relates to a ransomware detection and mitigation system.

GENERAL BACKGROUND

Cybersecurity attacks have become a pervasive problem for organizations as many electronic devices and other resources have been subjected to attack and compromised. An attack may involve the infiltration of malicious software onto an electronic device or concentration on an exploit residing within an electronic device to perpetrate the cybersecurity attack. Both of these types of attacks are the result of "malware."

In particular, cyber-attacks (e.g., ransomware attacks) have become increasingly common and may lead to the loss of important data. Ransomware is a type of malware that attempts to installs itself covertly on a victim's network device, or is installed covertly, and carries out a cryptoviral extortion by holding data hostage until a ransom is paid. In one situation, ransomware may encrypt data and request a payment to unencrypt the data. Alternatively, ransomware may modify data such that the data is unreadable or otherwise inaccessible and request payment to return the data to its original form. As used herein, the term "unreadable" may be broadly interpreted as data that cannot be displayed by an application corresponding to the file type containing the data (e.g., data of a Portable Document Format (PDF) file that cannot be displayed by Adobe Reader is said to be "unreadable").

Many current ransomware detection techniques cannot prevent attacks before they happen and thus cause data inaccessibility from "file-zero" (i.e., the first file affected by the ransomware) unless a ransom is paid. Current techniques of monitoring often cannot protect the first file because they rely on post modification detection techniques. Specifically, current ransomware detection techniques typically analyze the victimized system (e.g., a network device or a plurality of network devices) to determine at least the malware that caused the encryption of the data as well as the encryption method. For example, current ransomware detection techniques may analyze a victimized network device to determine a software application or program that was downloaded (e.g., a Trojan which contained the ransomware). A signature of the detected software application or program, or portion thereof containing the ransomware, may be added to a blacklist to be used for future malware scans in an attempt to detect the ransomware before it is executed and its attack is carried out.

However, current ransomware detection techniques fail to protect the initial victimized network device (or plurality of network devices) from ransomware attacks. Thus, the initial ransomware attack may succeed in locking one or more victims out of accessing data that is being held hostage. As a result, the victim or victims, may lose the data or may be forced to pay a ransom in hopes of having the data being held hostage returned. Such a situation may have very negative consequences, especially if accessing the data is time sensitive (e.g., patient data in hospitals). Therefore, enhancements to current ransomware detection systems are needed to prevent the loss of data from "file-zero."

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

I. Overview Summary

Figure 1A:
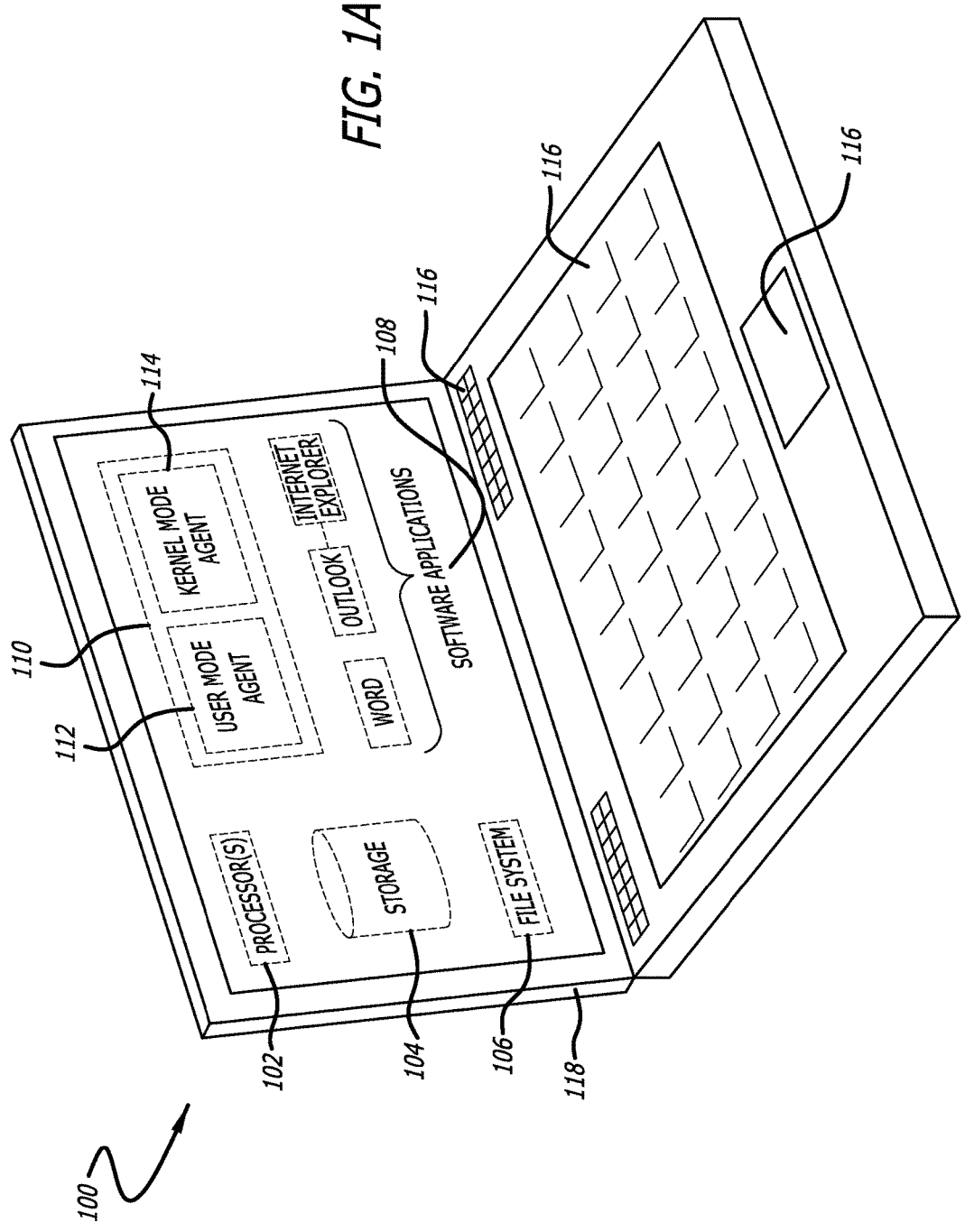
FIG. 1A is an exemplary block diagram of a general, physical representation of logic components of a ransomware detection and mitigation system illustrated within a network device.

Embodiments of a system and method for ransomware detection and mitigation are described. The ransomware detection and mitigation system provided is capable of detecting a ransomware attack and restoring any affected data to a version of the data stored prior to the occurrence of the attack.

For example, a ransomware detection and mitigation software application, e.g., a software module including monitoring agents and analysis agents, is installed on a network device (e.g., a laptop). The software module monitors software applications on the laptop, for example, Microsoft Outlook, Internet Explorer, etc. The monitoring may include detecting an attempt by a suspicious process, e.g., an instance of the executing software application, to open a file, especially, for example, when the suspicious process includes the ability to write to the file. The software module monitors any modifications made to the file initiated by the suspicious process and analyzes the file when the suspicious process closes the file. The software module determines whether the suspicious process is associated with a cyber-attack (e.g., a cryptoviral attack or a ransomware attack) based on an analysis of at least the entropy (e.g., randomness) of the modification of the file by the suspicious process, whether the file has been modified and is no longer a recognizable file type or able to be opened, and/or whether the file has been encrypted. When the software module determines the suspicious process is associated with a ransomware attack, the software module may generate an alert to the user of the network device, terminate the suspicious process, and quarantine the software application that caused the execution of the suspicious process. As used herein, the term "quarantine" may refer to the movement of a file or folder into a specified location in storage. In one embodiment, the specified location in storage may be isolated so that applications cannot access the data stored therein to prevent infection of an endpoint device, network device, etc.

In one embodiment, the ransomware detection and mitigation system is installed on an endpoint device (e.g., a host device) as a software module that monitors the creation of binaries by applications (often called a "dropped" or "child" process) commonly associated with known threat vectors (i.e., email clients, internet browsers, etc.). If a binary (e.g., an executable) is generated by a monitored application, it is considered "suspicious." For example, the generation of an executable, or modification thereof, by a monitored application may result in the executable being deemed suspicious by the ransomware detection and mitigation system. Subsequently, the process initiated by the running of the suspicious executable may be deemed a suspicious process by the ransomware detection and mitigation system. The behaviors associated with suspicious processes are monitored by a kernel mode monitor and/or a user mode agent of the ransomware detection and mitigation system. Additionally, a process may be determined to be suspicious based on one or more of the following factors: (i) whether the executable run to initiate the process was obtained through data manipulation by a monitored process (e.g., download, creation or data modification, wherein one specific example may include a "drive by download" that includes the downloading of a binary without consent of a user, or via social engineering), (ii) whether the running of the executable that initiated the process is being monitored by the ransomware detection and mitigation system for the first time (e.g., on the endpoint device on which the ransomware detection and mitigation system is installed), (iii) whether the process is a non-system process (as used herein, a non-system process is a process that is not owned or initiated by the operating system, e.g., a process initiated by an application the execution of which was started by a user), (iv) whether the process and/or executable are on a white list (e.g., a list of executables and/or processes that known to be benign, or includes a trusted digital signature). The ransomware detection and mitigation system may take into account one or more of the factors in determining whether the process is suspicious.

In one ransomware detection and mitigation embodiment, a software module including a user mode agent and a kernel mode agent is installed on an endpoint device. The kernel mode agent may intercept an attempt to launch an application (e.g., the initiation of a process). Herein, the term "launch" (and other tenses) represents performance of one or more events that initiates activation of an object under analysis (that may include an executable the running of which initiates one or more processes). The kernel mode agent signals the interception to the user mode agent, which analyzes the process to determine whether the process should be deemed suspicious. The suspiciousness analysis performed by the user mode agent may include, inter alia, a determination as to whether the executable file of the newly initiated process was generated or modified by a monitored process (e.g., that appears on a predetermined list of processes to monitor), analysis of one or more predetermined static factors of the newly initiated process, a determination as to whether the newly initiated process is a non-system process being analyzed for the first time, etc. The suspiciousness analysis performed by the user mode agent may result in the user mode agent determining a score representing the level of suspiciousness of the newly initiated process (e.g., a probability score, expressed as a number or percentage). If the score is greater than or equal to a predefined threshold, the newly initiated process will be deemed suspicious.

A suspicious process is monitored by the user mode and kernel mode monitors, while the kernel mode agent intercepts any attempt to open a "protected file," which may be broadly construed as one or more files, one or more folders, one or more file systems and/or any other collection of data in an organized structure, when the suspicious process has permissions to write to, or modify, the protected file. In response to intercepting the attempt to open a protected file with write permissions, the kernel mode agent copies at least a portion of the protected file to storage that is not accessible by the suspicious process. The kernel mode agent may inform the user mode agent of the intercepted attempt to open the protected file. Subsequent to copying at least a portion of the protected file to storage, the kernel mode agent permits the suspicious process to open the protected file and the user mode monitor monitors the behaviors of the suspicious process.

The kernel mode agent intercepts an operation by the suspicious process to close the protected file. Responsive to detecting the close of the protected file, the kernel mode agent may perform an entropy calculation on the protected file and provide the result of the entropy calculation to the user mode agent. The user mode agent may then determine if the protected file is no longer a recognizable file type or able to be opened (e.g., due to modification of at least a portion of the protected file), has been encrypted, and/or the result of the entropy calculation is above a predefined randomness threshold. In one embodiment, the user mode agent determines whether the protected file is no longer recognizable by parsing and analyzing at least a portion of the header of the protected file. For example, the user mode agent reads (e.g., parses) the file header and determines whether the parsed file header is no longer readable. In one embodiment, the determination as to whether the parsed file header is no longer readable may include the user mode agent analyzing the parsed file header for one or more known byte segments indicating that the file header corresponds to a known file header structure. For example, the user mode agent may analyze a predetermined number of bytes starting from the beginning of the protected file, e.g., a byte segment, to determine whether the byte segment includes known indicia of the file type such as, but not limited or restricted to, a file type, a file type specification or version, etc. When the user mode agent detects one or more known byte segments, the protected file header (e.g., following opening and closing of the protected file by the suspicious process) is deemed readable; thus, the suspicious process may be found to be benign (e.g., not associated with a ransomware attack). Alternatively, when the user mode agent does not detect one or more known byte segments, the protected file header is deemed unreadable; thus, the suspicious process may be found to be associated with a ransomware attack.

In a second embodiment, the determination as to whether the parsed file header is no longer readable may include comparing the parsed file header structure (or a portion thereof) against known file header structures for one or more file types. The result of the comparison (e.g., one or more similarity scores) may be used to determine whether the parsed filer header is readable. For example, the parsed file header may be deemed readable when a similarity score is greater than or equal to a predetermined threshold. As an example, when the protected file is a PDF file, the user mode agent may parse the file header and compare the parsed file header structure against the known file header structure for a PDF file to determine a similarity score. When the similarity score is greater than or equal to a predetermined threshold, the protected file header is deemed readable; thus, the suspicious process may be found to be benign (e.g., not associated with a ransomware attack). Alternatively, when the similarity score is less than the predetermined threshold, the protected file header is deemed unreadable; thus, the suspicious process may be found to be associated with a ransomware attack. The known byte segments and the known file header structures may be stored in the storage 104, as shown in FIG. 1.

In one embodiment, the user mode agent may assign scores to: (i) results of an analysis as to whether the protected file has been corrupted (which may refer to, but is not limited or restricted to, modification or alteration of any portion of the protected file such that the content of the protected file has been rendered unreadable and/or inaccessible), (ii) results of an analysis as to whether the protected file has been encrypted and/or the suspicious process used application programming interfaces (APIs) corresponding to encryption methods, or (iii) the result of the entropy calculation. Based on the assigned scores, the user mode agent determines whether a single score or a combination of two or more scores is above a predefined threshold. Based on the analysis, the user mode agent determines whether the suspicious process is associated with a ransomware attack. When the user mode agent determines the suspicious process is associated with a ransomware attack, an alert is generated and the kernel mode agent is instructed to restore the protected file to the version that was copied to storage by the kernel mode agent. In some embodiments, the generated alert may include information obtaining during analysis and monitoring of the suspicious process that identifies the suspicious process and the application responsible for initiating the suspicious process. The alert may also include information identifying one or more operations performed by or caused to be performed by the suspicious process. In some embodiments, the alert may provide information pertaining a source of the application responsible for initiating the suspicious process (e.g., an email, Uniform Resource Locator (URL) from which the application was downloaded, etc.) Furthermore, in some embodiment, the alert may include information pertaining to the origin of the suspicious (e.g., whether a child process and a corresponding parent process, if applicable) and/or whether any child processes were initiated. Thus, the alert may provide the user of the endpoint device, network administrators or the like to perform a targeted remediation process (e.g., terminate the suspicious process, remove the application responsible for initiating the suspicious process, prevent the spread of the application responsible for initiating the suspicious process, etc.) The suspicious process may be terminated and the corresponding application quarantined by the user mode agent.

Alternatively, or in addition to intercepting a request to close the protected file by the suspicious process, the kernel mode monitor may intercept requests by the suspicious process to write to the protected file. Upon intercepting a write request, the kernel mode agent determines whether the location within the protected file to be written to pertains to the header (e.g., based on byte offset set forth in the write request). For example, the kernel mode agent may determine whether the byte offset of the location to be written to is within a predetermined number of bytes from the beginning of the file. When the kernel mode agent determines the write request is attempting to modify the header, the kernel mode agent notifies the user mode agent (e.g., and provides the user mode agent with the bytes attempted to be written). When the user mode agent determines the bytes attempted to be written will corrupt the header, the suspicious process may be found to be associated with a ransomware attack. When the user mode agent determines the bytes attempted to be written will not corrupt the header, thus, the suspicious process may be found to be benign (e.g., not associated with a ransomware attack).

II. Terminology

In the following description, certain terminology is used to describe various features of the invention. For example, each of the terms "logic" and "component" may be representative of hardware, firmware or software that is configured to perform one or more functions. As hardware, the term logic (or component) may include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the logic (or component) may include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or component) may be stored in persistent storage.

Herein, a "communication" generally refers to related data that is received, transmitted, or exchanged within a communication session. The data may include a plurality of packets, where a "packet" broadly refers to a series of bits or bytes having a prescribed format. Alternatively, the data may include a collection of data that may take the form of an individual or a number of packets carrying related payloads, e.g., a single webpage received over a network.

The term "computerized" generally represents that any corresponding operations are conducted by hardware in combination with software and/or firmware.

The term "agent" generally refers to a module of software installed on a target system (e.g., an endpoint device) that enables a user (e.g., a human such as an administrator or an external computer system) to monitor and interact with the target system. Agents allow users to gather information about multiple aspects of the target system. Agents also permit users to remotely retrieve the contents of the target system's memory or hard drive, and could potentially be configured to modify its contents. The agent may be configured to either communicate over a computer network, or to read and write all relevant configuration information and acquired data to a computer storage medium, such as a hard drive or removable read/write media (USB key, etc.). In one embodiment, the agent is built in a modular fashion. The ability to gather a particular piece of data from a target system (e.g. a list of running processes on the target system or a log file or timeline) is implemented as a discrete module of software and loaded by the agent. This allows for easy adaptation of the agent to different environments that have specific requirements for data collection.

According to one embodiment of the disclosure, the term "malware" may be broadly construed as any code, communication or activity that initiates or furthers a cyber-attack. Malware may prompt or cause unauthorized, anomalous, unintended and/or unwanted behaviors or operations constituting a security compromise of information infrastructure. For instance, malware may correspond to a type of malicious computer code that, as an illustrative example, executes an exploit to take advantage of a vulnerability in a network, network device or software, for example, to gain unauthorized access, harm or co-opt operation of a network device or misappropriate, modify or delete data. Alternatively, as another illustrative example, malware may correspond to information (e.g., executable code, script(s), data, command(s), etc.) that is designed to cause a network device to experience anomalous (unexpected or undesirable) behaviors. The anomalous behaviors may include a communication-based anomaly or an execution-based anomaly, which, for example, could (1) alter the functionality of a network device executing application software in an atypical manner; (2) alter the functionality of the network device executing that application software without any malicious intent; and/or (3) provide unwanted functionality which may be generally acceptable in another context.

A "characteristic" includes data associated with an object under analysis that may be collected without execution of the object such as metadata associated with the object (e.g., size, name, path, etc.) or content of the object (e.g., portions of code) without execution of the selected object. A "behavior" is an activity that is performed in response to execution of the object.

The term "network device" may be construed as any electronic computing system with the capability of processing data and connecting to a network. Such a network may be a public network such as the Internet or a private network such as a wireless data telecommunication network, wide area network, a type of local area network (LAN), or a combination of networks. Examples of a network device may include, but are not limited or restricted to, an endpoint device (e.g., a laptop, a mobile phone, a tablet, a computer, etc.), a standalone appliance, a server, a router or other intermediary communication device, a firewall, etc.

The term "transmission medium" may be construed as a physical or logical communication path between two or more network devices or between components within a network device. For instance, as a physical communication path, wired and/or wireless interconnects in the form of electrical wiring, optical fiber, cable, bus trace, or a wireless channel using radio frequency (RF) or infrared (IR), may be used. A logical communication path may simply represent a communication path between two or more network devices or between components within a network device.

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. General Architecture

Referring now to FIG. 1A, an exemplary block diagram of a general, physical representation of logic components of a ransomware detection and mitigation system illustrated within a network device is shown. Herein, the ransomware detection and mitigation system 110 is shown as being installed on an endpoint device 100 (e.g., a laptop computer), which includes one or more processors 102, a persistent storage 104 (e.g., a non-transitory computer-readable medium storage), a file system 106 and one or more software applications 108. The ransomware detection and mitigation system 110 is shown to include a user mode agent 112 (e.g., a user agent) and a kernel mode agent 114.

The endpoint device 100 includes one or more interfaces which include network interfaces and/or input/output (I/O) interfaces 116. According to this embodiment of the disclosure, these components are connected by a transmission medium, not shown, such as any type of interconnect (e.g., bus), are at least partially encased in a housing 118 made entirely or partially of a rigid material (e.g., hardened plastic, metal, glass, composite, or any combination thereof). The housing 118 protects these components from environmental conditions.

Figure 1B:
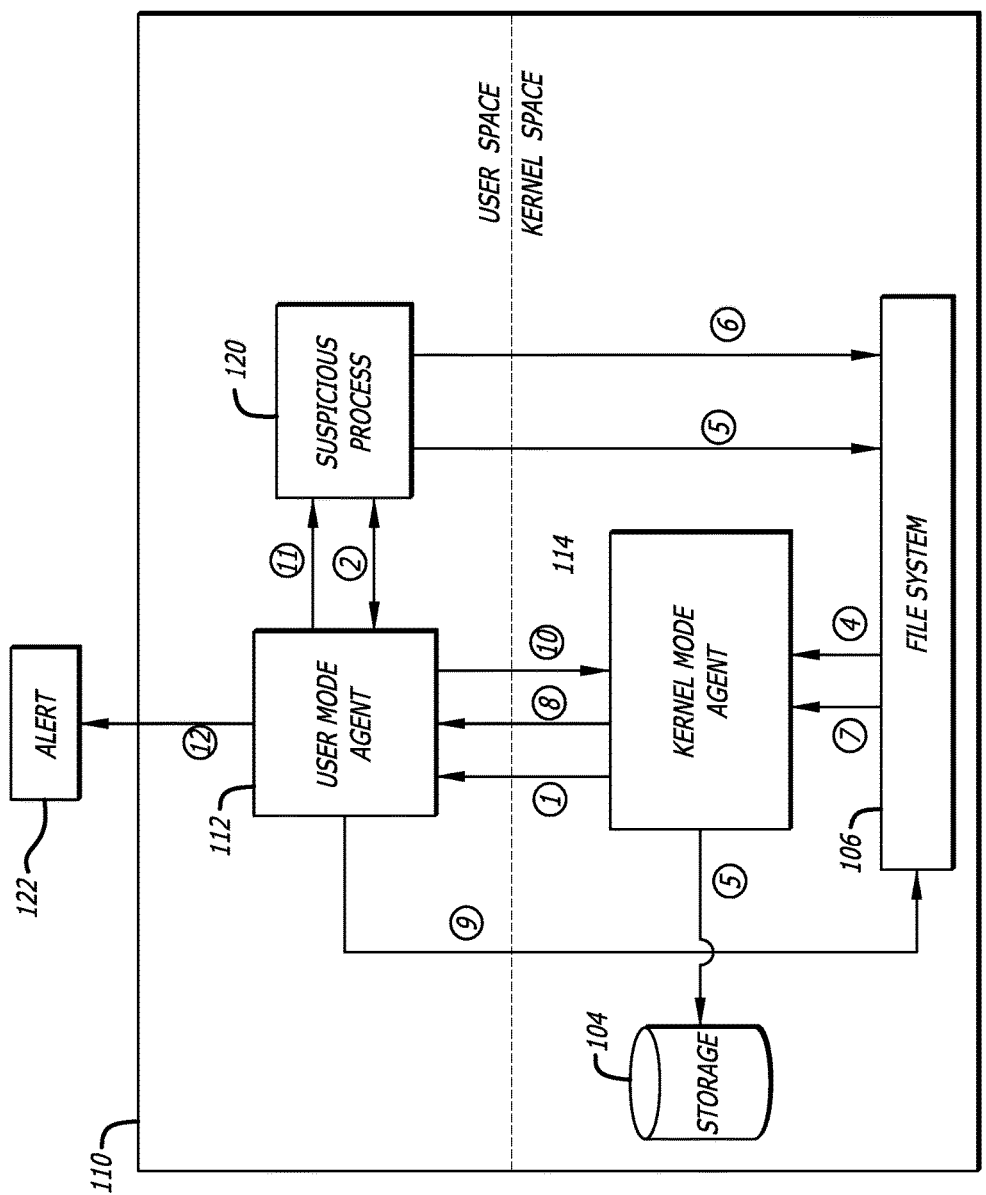
FIG. 1B is an exemplary block diagram of operations of a ransomware detection and mitigation system.

Referring to FIG. 1B, an exemplary block diagram of operations of a ransomware detection and mitigation system is shown. The ransomware detection and mitigation system 110 is shown located in both the user space (e.g., upper section) and the kernel space (e.g., lower section), e.g., includes components located in each space. The user mode agent 112 of the ransomware detection and mitigation system 110 is located in user space while the kernel mode agent 114 is located in kernel space. FIG. 1B illustrates exemplary interactions between the user mode agent 112, the kernel mode agent 114, storage 104, the file system 106 and a suspicious process 120. The interactions, referenced by circled numbers, correspond to operations of one or more of the components illustrated. Initially, in one embodiment, the ransomware detection and mitigation system begins a detection and mitigation process by intercepting, by the kernel mode agent 114, an attempt to launch an application and initiate a process. In response, the kernel mode agent 114 notifies the user mode agent 112 of the interception (operation 1). The user mode agent 112 analyzes the initiated process to determine whether the process is suspicious (operation 2). The determination of suspiciousness includes a determination as to one or more of the following factors: (i) whether the executable of the launched application was obtained via data manipulation (e.g., written, created, or downloaded) by a monitored process, (ii) whether the execution of the launched application is being monitored by the ransomware detection and mitigation system for the first time, (iii) whether the process is a non-system process, (iv) whether the process and/or executable are on a white list, (v) whether the process is signed by a whitelisted digital signature, and/or (iv) whether the process is a child process of a suspicious process. The ransomware detection and mitigation system may take into account one or more of the factors in determining whether the process is suspicious (hereinafter, the process will be referred to as the suspicious process 120).

Operations of the suspicious process 120 are monitored by the ransomware detection and mitigation system 110. During monitoring of the suspicious process 120, the kernel mode agent 114 may intercept an attempt by the suspicious process 120 to open a protected file (operation 3). The interception of an attempt to open a protected file may be done by the kernel mode agent 114 as access to the file system 106, located within the kernel space, will be requested. Further, in one embodiment, the kernel mode agent 114 may only intercept an attempt by the suspicious process 120 to access protected files when the attempted access is performed with the suspicious process 120 having at least "write" permissions (e.g., corresponding to the well-known file permissions of read, write and execute).

As a result of the attempted access of the protected file by the suspicious process 120, the kernel mode agent 114 accesses the file system (operation 4) and copies at least the portion of the protected file being accessed to storage 104 (operation 5). A purpose of copying at least the portion of the protected file being accessed to storage 104 is to save the state (e.g., contents, metadata, etc.) of the protected file prior to providing the suspicious process 120 access thereto. Thus, by saving a copy of at least a portion of the protected file prior to providing access to the suspicious process 120, the ransomware detection and mitigation system 110 is able to prevent and/or mitigate the effects of a ransomware attack. Specifically, as will be discussed below, when the suspicious process 120 is determined to be associated with a ransomware attack, the encrypted or corrupted protected file can be restored to a prior state with the copy stored in the storage 104.

After copying at least a portion of the protected file to the storage 104, the kernel mode agent 114 may provide the suspicious process 120 with access to the protected file. During processing, the suspicious process 120 may modify the protected file or encrypt the protected file (operation 6). In one embodiment, the kernel mode agent 114 may intercept the attempt to modify or encrypt the protected file to ensure the portion of the protected file being modified or encrypted has been copied to the storage 104 and/or copy the portion of the protected file being modified or encrypted to the storage 104. During further monitoring of the suspicious process 120, the kernel mode agent 114 may intercept a close request by the suspicious process 120 to close the protected file (operation 7). Subsequent to intercepting the close request, the kernel mode agent 114 may analyze the protected file. In one embodiment, the analysis of the protected file by the kernel mode agent 114 includes an entropy calculation to determine a level of the randomness of any modifications made by the suspicious process 120.

The kernel mode agent 114 notifies the user mode agent 112 of the file close and provides the user mode agent 112 with results of the analysis (e.g., a result of the entropy calculation) (operation 8).

The user mode agent 112 also performs an analysis on the protected file (operation 9) to determine if the protected file has been modified in such a way that the protected file is no longer useable and/or readable by an associated application. For example, in one embodiment, the user mode agent 112 may analyze any modifications made to the header of the protected file to determine whether the header was modified to render the content of the protected file corrupted. Additionally, the analysis performed by the user mode agent 112 may include an analysis of the operations performed by or caused to be performed by the suspicious process 120. For example, the analysis may include a determination as to whether the suspicious process 120 used any cryptographic APIs (such a determination may be done with information provided by the kernel mode agent 114). The user mode agent 112 may assign a score to one or more of (i) the result of the entropy calculation, e.g., whether the resultant level of entropy is greater than or equal to a first threshold, or a score based on a sliding scale according to the resultant level of entropy, (ii) the result of the determination as to whether the protected file, particularly its header, was modified in such a way that the protected file is no longer useable and/or readable, and/or (iii) the result of the determination as to whether the suspicious process 120 used any cryptographic APIs. Based on any one score, or a combination of two or more of scores, the user mode agent 112 determines whether the suspicious process 120 is associated with ransomware or with a ransomware attack.

In response to determining the suspicious process 120 is associated with ransomware or with a ransomware attack, the user mode agent 112 notifies the kernel mode agent 114 and instructs the kernel mode agent 114 to restore the protected file to a prior state using the copy stored in the storage 104 (operation 10). Additionally, the user mode agent 112 may terminate and/or quarantine the suspicious process 120 (operation 11). Finally, user mode agent 112 may generate an alert 122 to notify a user of the endpoint on which the ransomware detection and mitigation system 110 is running of the presence of a ransomware attack (operation 12).

Figure 2:
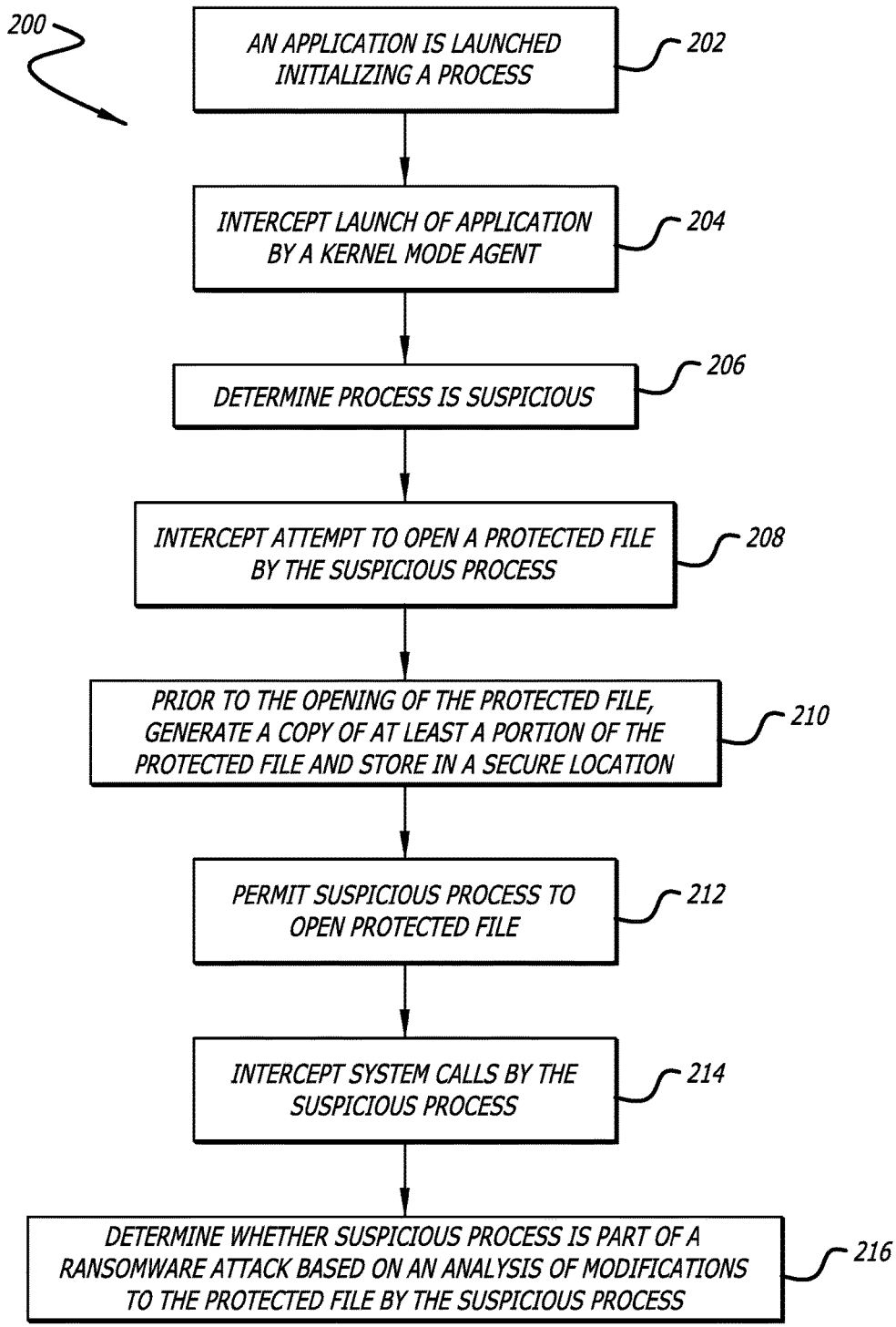
FIG. 2 is an exemplary embodiment of a flowchart illustrating operations of ransomware detection and mitigation system of FIG. 1B.

Referring to FIG. 2, an exemplary embodiment of a flowchart illustrating operations of ransomware detection and mitigation system of FIG. 1B is shown. Each block illustrated in FIG. 2 represents an operation performed in the method 200 of monitoring the processing of a suspicious process in order to determine whether the application that launched the suspicious process is associated with ransomware or a ransomware attack by the ransomware detection and mitigation system. Herein, the ransomware detection and mitigation system monitors the processing of one or more applications within a computing environment. In one embodiment, the ransomware detection and mitigation system may operate and monitor the one or more applications processing in real-time in the computing environment as the electronic device is operates. In a second embodiment, the ransomware detection and mitigation system may operate and monitor the one or more applications processing within a virtualized computing environment. Herein, the term "computing environment" may be used to refer to either a real-time computing environment and/or a virtualized computing environment. The method 200 begins when an application is launched within the computing environment initiating a process (block 202). Specifically, a kernel mode agent of the ransomware detection and mitigation system intercepts the launch of the application and the initiation of the process (block 204).

The user mode agent of the ransomware detection and mitigation system is notified of the interception and determines whether the process is suspicious (block 206). As discussed above, the determination as to whether of suspiciousness includes a determination as to one or more of the following factors: (i) whether the executable of the launched application was written, created, or downloaded by a monitored process, (ii) whether the executable of the launched application is being monitored by the ransomware detection and mitigation system for the first time, (iii) whether the process is a non-system process, (iv) whether the process and/or executable are on a white list, (v) whether the process is signed by a whitelisted digital signature. The ransomware detection and mitigation system may take into account one or more of the factors in determining whether the process is suspicious.

Responsive to determining the process is suspicious, the operations, directly or indirectly, caused by the suspicious process are monitored. In particular, the kernel mode agent may intercept an attempt, by the suspicious process, to open a protected file (block 208). Prior to providing the suspicious process with access to the protected file, the kernel mode agent copies at least a portion of the protected file to a secure storage location (block 210). As discussed above, in one embodiment, the kernel mode agent may copy the entire protected file to the secure storage location. As an alternative embodiment, the kernel mode agent may copy a portion of the protected file less than the entire file to the secure storage location.

After copying at least a portion of the protected file to the secure storage location, the kernel mode agent provides the suspicious process with access to the protected file (block 212). After providing the suspicious process with access to the protected file, the ransomware detection and mitigation system continues to monitor the operations, directly or indirectly, caused by the suspicious process. During the monitoring following the provision of access to the protected file, the kernel mode agent may intercept system calls by the suspicious process to close the protected file (block 214). For example, the kernel mode agent may intercept a close request from the suspicious process to close the protected file and/or a request by the suspicious process to rename a protected file.

Responsive to intercepting the close request by the suspicious process, the ransomware detection and mitigation system determines whether the suspicious process is part of a ransomware attack based on an analysis of one or more of: (i) an entropy calculation, e.g., whether the resultant level of entropy is greater than or equal to a first threshold, or a score based on a sliding scale according to the resultant level of entropy, (ii) whether the protected file, particularly its header, was modified in such a way that the protected file is no longer useable, accessible and/or readable, and/or (iii) whether the suspicious process used any cryptographic APIs (block 216). As will be discussed in more detail below with respect to FIG. 3, the determination as to whether the suspicious process is associated with a ransomware attack may take into account one or more factors and, in some embodiments, a combination of one or more factors.

Figure 3:
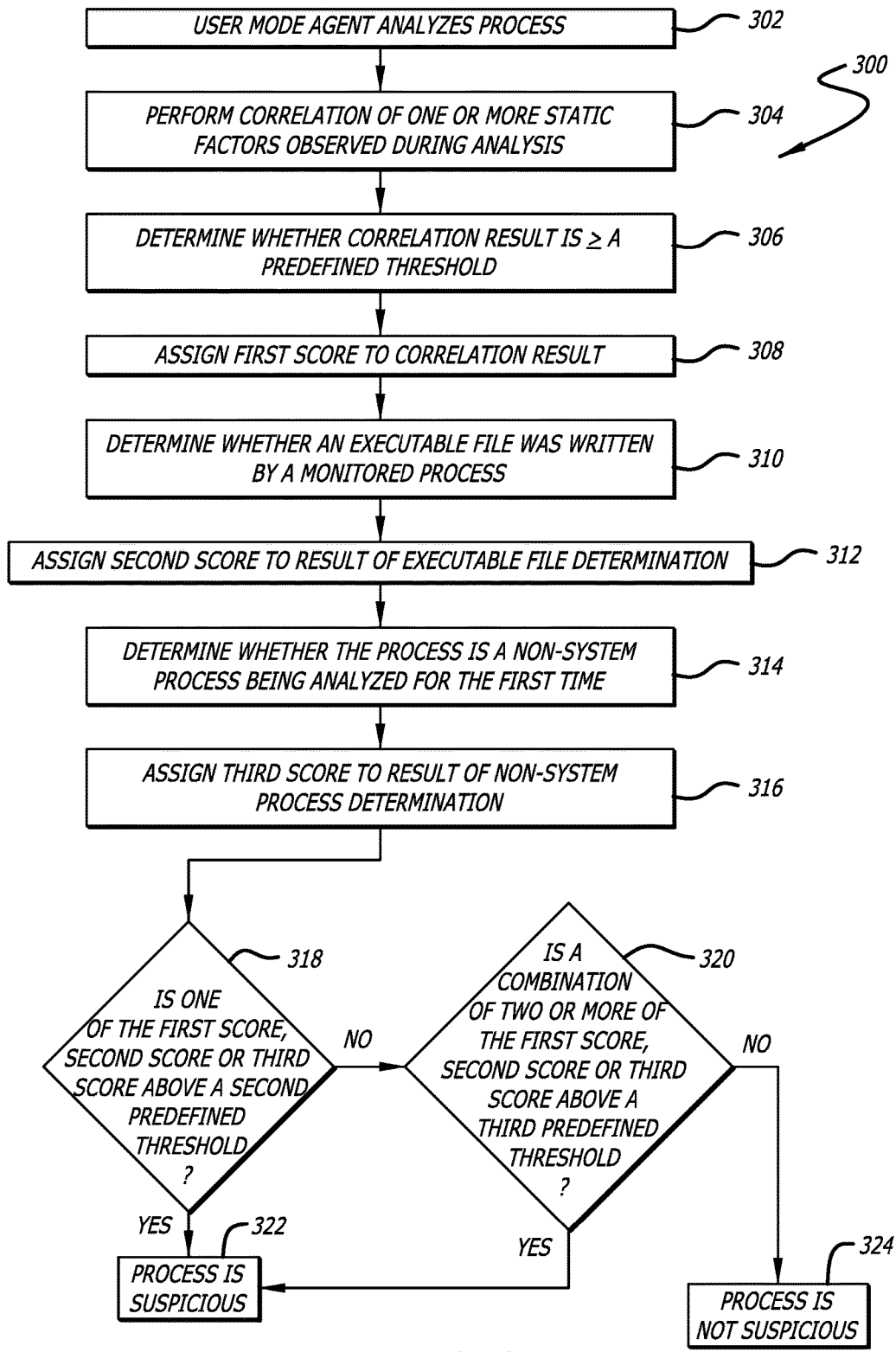
FIG. 3 is an exemplary embodiment of a flowchart illustrating the operations of determining whether a process being initiated in a computing environment monitored by the ransomware detection and mitigation system is suspicious.

Referring now to FIG. 3, an exemplary embodiment of a flowchart illustrating the operations of determining whether a process being initiated in a computing environment monitored by the ransomware detection and mitigation system is suspicious is shown. Each block illustrated in FIG. 3 represents an operation performed in the method 300 of performing a pre-processing determination as to whether the process being initiated is suspicious, e.g., associated with an application that is potentially ransomware or associated with a ransomware attack. Herein, the user mode agent of the ransomware detection and mitigation system performs a static analysis on the process (block 302). The method 300 continues with the user mode agent performing a correlation of one or more factors observed during a static analysis (block 304). At block 306, the user mode agent determines whether the correlation result is greater than or equal to a predefined threshold. The user mode agent assigns a first score to the result of the correlation (block 308).

The user mode agent also determines whether the executable file corresponding to the initiation of the process was written by a monitored process (block 310). The user mode agent then assigns a second score to the result of the determination as to whether the executable was written by a monitored process (block 312).

Furthermore, the user mode agent also determines whether the process is a non-system process being analyzed by the ransomware detection and mitigation system for the first time (block 314). The user mode agent then assigns a third score to the result of the determination as to whether the process is a non-system process being analyzed for the first time (block 316).

In one embodiment, following assignment of the first, second and third scores, the user mode agent determines whether one of the scores is greater than or equal to a corresponding predefined threshold (block 318). When the user mode agent determines at least one score is greater than or equal to a corresponding predefined threshold (yes at block 318), the user mode agent determines the process is suspicious (block 322). When the user mode agent determines each of the first, second and third scores are each less than the corresponding predefined thresholds (no at block 318), the user mode agent determines whether a combination of two or more of the first score, the second and/or the third score are greater than or equal to a predefined combined threshold. When the user mode agent determines the combination of two or more of first score, the second and/or the third score is greater than or equal to the predefined combined threshold (yes at block 320), the user mode agent determines the process is suspicious (block 322). When the user mode agent determines no combination of two or more of first score, the second and/or the third score is greater than or equal to the predefined combined threshold (no at block 318), the user mode agent determines the process is not suspicious (block 324).

The scoring process as described herein may refer to a plurality of separate scores. In an alternative embodiment, the assignment of a second score may be an adjustment or modification of the first assigned score. Similarly, the assignment of a third score may refer either to the assignment of a third score separate from the assignment of the first and/or second scores or a modification of the first and/or second scores.

Figure 4:
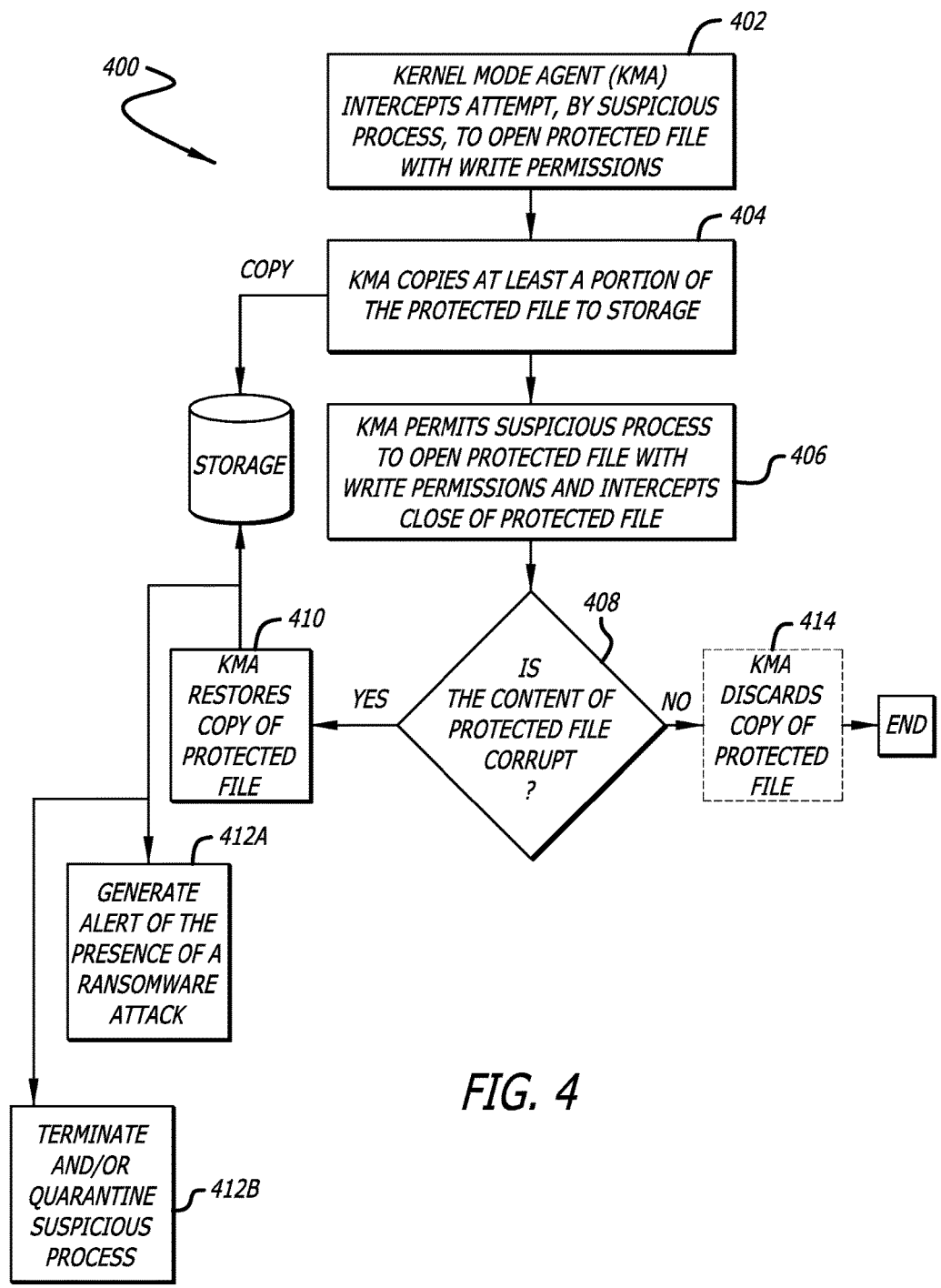
FIG. 4 is an exemplary embodiment of a flowchart illustrating operations of the ransomware detection and mitigation system of FIG. 1 in detecting a ransomware attack and restoring any affected data to a version of the data stored prior to the occurrence of the attack.

Referring now to FIG. 4, an exemplary embodiment of a flowchart illustrating operations of the ransomware detection and mitigation system of FIG. 1 in detecting a ransomware attack and restoring any affected data to a version of the data stored prior to the occurrence of the attack is shown. Each block illustrated in FIG. 4 represents an operation performed in the method 400 of detecting a ransomware attack and restoring any affected data to a version of the data stored prior to the occurrence of the attack. Herein, the kernel mode agent (KMA) intercepts an attempt by a suspicious process to open a protected file with write permissions (block 402). In response to intercepting the attempt to open a protected file with write permissions, the KMA copies at least a portion of the protected file to storage, as will be discussed in detail with respect to FIG. 5 (block 404).

Subsequent to the KMA copying at least a portion of the protected file to storage, the KMA permits the suspicious process to open and access the protected file with write permissions (block 406). Additionally, the KMA intercepts a request by the suspicious process to close the protected file (block 406). In response to intercepting the request to close the protected file by the suspicious process, the user mode agent determines whether the content of the protected file is corrupted (e.g., modified in such a way the protected file is so longer accessible, encrypted, etc.) (block 408). When the user mode agent determines the protected file is corrupted (yes at block 408), the user mode agent instructs the KMA to restore the protected file to a previous version, e.g., the version saved in the storage prior to permitting the suspicious process to access the protected file (block 410). In addition to restoring the protected file to a prior version, the user mode agent may generate an alert that may be transmitted to one or more of a network administrator, security administrator, network security and forensics analyst, and the like ("administrator") or a user of the endpoint device (block 412A) and terminate and/or quarantine the suspicious process (block 412B). In addition, the corrupted file may be one or more of: (i) deleted, (ii) quarantined for additional analyses by the ransomware detection and mitigation system, and/or (iii) provided to an administrator for additional analyses by a remote analysis system. When the user mode agent determines the protected file is not corrupted (e.g., not modified to be unreadable or otherwise inaccessible, not encrypted, etc.) (no at block 408), the user mode agent determines the suspicious process did not perform operations associated with a ransomware attack and discards the copy of the protected file (block 414).

Figure 5:
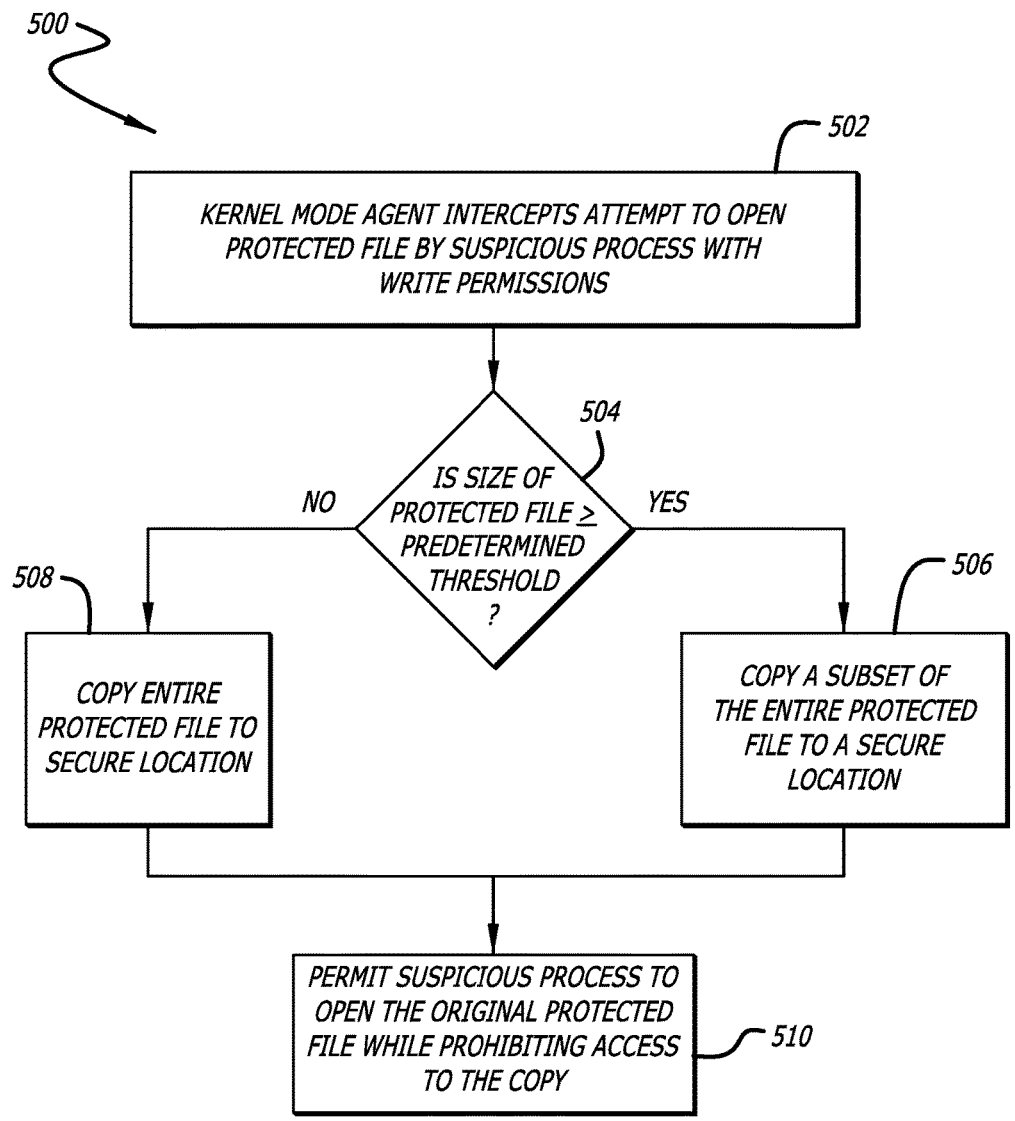
FIG. 5 is an exemplary embodiment of a flowchart illustrating operations of copying at least a portion of a protected to a remote storage in response to intercepting an attempt to open the protected file.

Referring now to FIG. 5, an exemplary embodiment of a flowchart illustrating operations of copying at least a portion of a protected to a remote storage in response to intercepting an attempt to open the protected file is shown. Each block illustrated in FIG. 5 represents an operation performed in the method 500 of intercepting an attempt to open a protected file and copying at least a portion of the protected file to a remote storage as a result. Herein, during monitoring of a suspicious process, the kernel mode agent of the ransomware detection and mitigation system intercepts an attempt, by the suspicious process, to open a protected file with write permissions (block 502). In response to intercepting the attempt to open the protected file, the kernel mode agent notifies the user mode agent of the interception. The user mode agent subsequently determines whether the size of the protected file is greater than or equal to a predetermined file size threshold (block 504). However, in a second embodiment, the kernel mode agent may make the determination as to whether the protected file is greater than or equal to the predetermined file size threshold.

When the user mode agent determines the protected file is greater than or equal to the predetermined file size threshold (yes at block 504), the user mode agent instructs the kernel mode agent to copy a portion of the protected file, e.g., a subset of the entire protected file, to a secure, remote location (block 506). When the user mode agent determines the protected file is less than the predetermined file size threshold (no at block 504), the user mode agent instructs the kernel mode agent to copy the entire protected file to a secure, remote location (block 508). Following either blocks 506 or 508, the kernel mode agent permits the suspicious file to open the original protected file while prohibiting access to the copy (block 510).

Figure 6A:
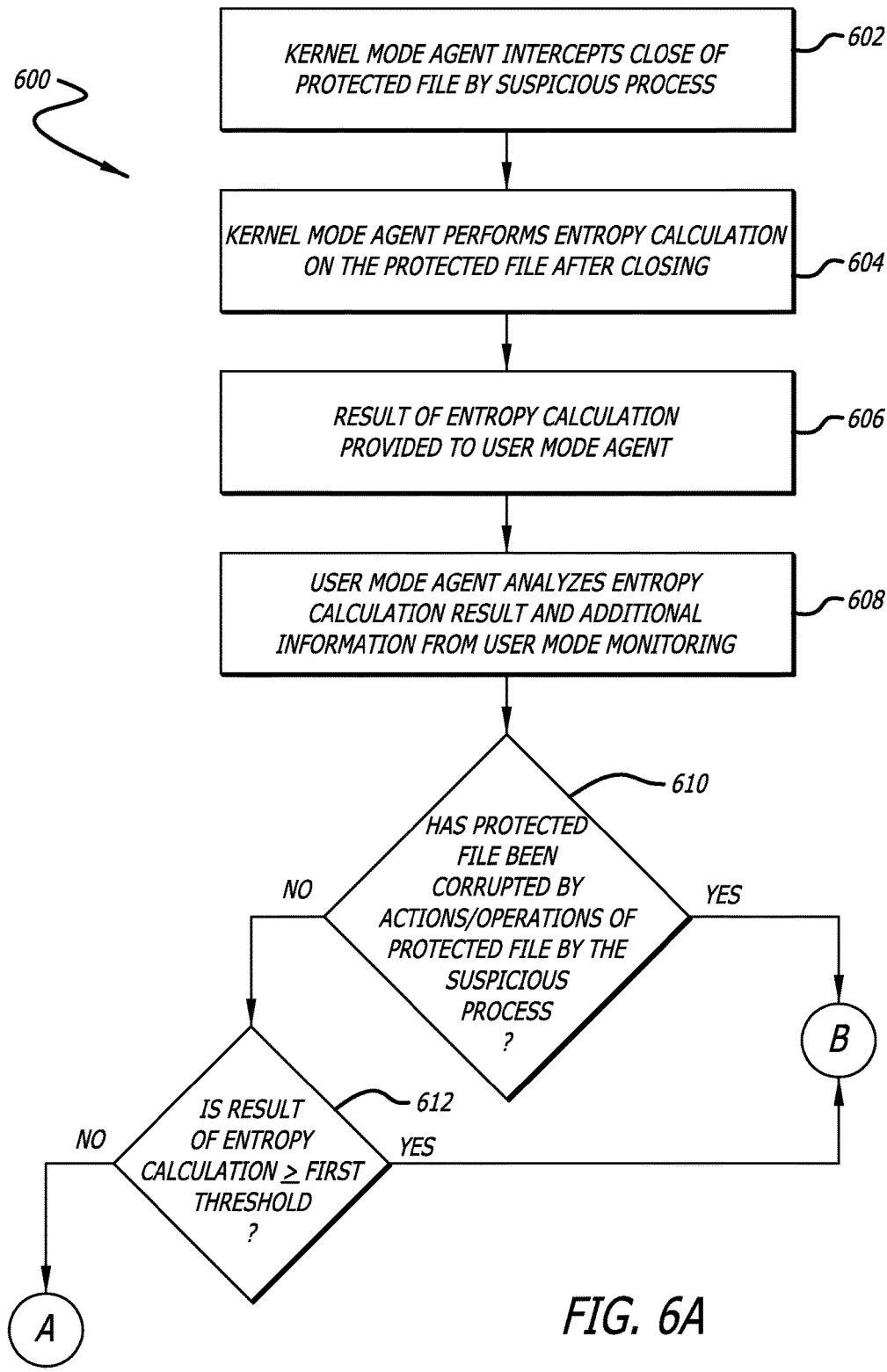
FIGS. 6A-6B provide an exemplary embodiment of a flowchart illustrating the operations determining whether a suspicious operation is associated with a ransomware attack following interception of a request to close a protected file.
Figure 6B:
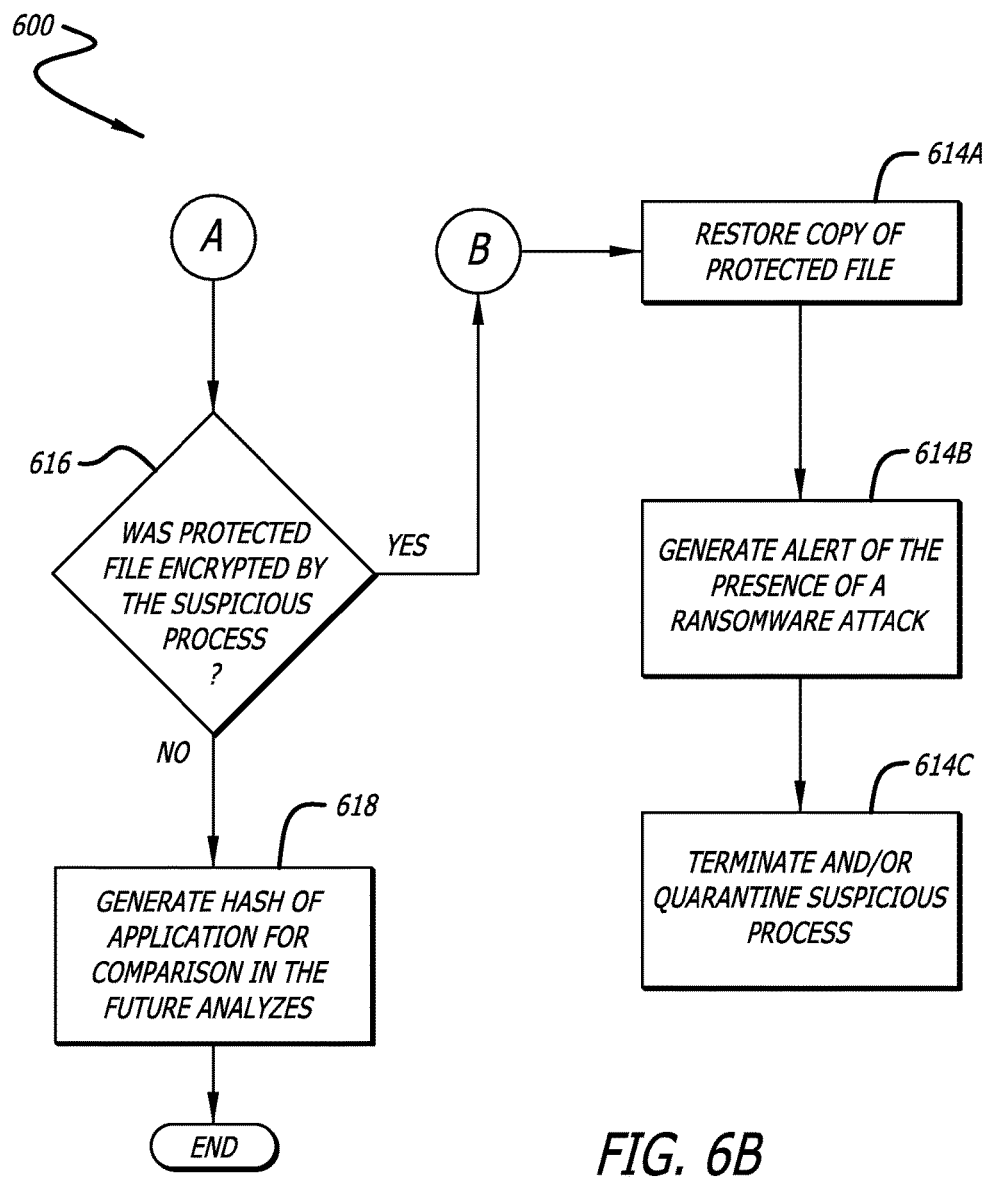

Referring to FIGS. 6A-6B, an exemplary embodiment of a flowchart illustrating the operations determining whether a suspicious operation is associated with a ransomware attack following interception of a request to close a protected file is shown. Each block illustrated in FIGS. 6A-6B represents an operation performed in the method 600 of determining whether a suspicious operation is associated with a ransomware attack following interception of a request to close a protected file. Herein, during monitoring of a suspicious process by the ransomware detection and mitigation system, the kernel mode agent (KMA) of the ransomware detection and mitigation system intercepts a request by the suspicious process to close a protected file opened by the suspicious process with write permissions (block 602). Responsive to intercepting the request to close the protected file, the KMA performs an entropy calculation on the protected file (block 604). The KMA subsequently provides the result of the entropy calculation to the user mode agent (block 606).

The user mode agent analyzes the result of the entropy calculation and additional information collected by the user mode agent (block 608). The additional information may include, but is not limited or restricted to, information collected by the user mode agent during monitoring of the suspicious process such as operations performed by the suspicious process, the result of operations performed by the suspicious process, use of encryption APIs by the suspicious process, etc. The user mode agent then makes a determination as to whether the protected file has been modified by the suspicious process such that the content of protected file is corrupted (block 610).

When the user mode agent determines that the protected file has been modified by the suspicious process to be corrupted (yes at block 610), the user mode agent instructs the KMA to restore the protected file to a previous version, e.g., a version saved in the storage prior to permitting the suspicious process to access the protected file (block 614A of FIG. 6B). In addition to restoring the protected file to a prior version, the user mode agent may generate an alert notifying administrators or a user of the endpoint device (block 614B) and terminate and/or quarantine the suspicious process (block 614C). When the user mode agent determines that the protected file has not been modified by the suspicious process such that the content of the protected file is corrupted (no at block 610), the user mode agent makes a determination as to whether the result of the entropy calculation is greater than or equal to a first threshold (block 612).

When user mode agent determines the result of the entropy calculation is greater than or equal to a first threshold (yes at block 612), the user mode agent instructs the KMA to restore the protected file to a previous version (block 614A of FIG. 6B). In addition to restoring the protected file to a prior version, the user mode agent may generate an alert notifying administrators or a user of the endpoint device (block 614B) and terminate and/or quarantine the suspicious process (block 614C).

When user mode agent determines the result of the entropy calculation is not greater than or equal to a first threshold (no at block 612), the user mode agent makes a determination as to whether the protected file has been encrypted by the suspicious process (block 616).

When the user mode agent determines that the protected file has been encrypted by the suspicious process (yes at block 614), the user mode agent instructs the KMA to restore the protected file to a previous version (block 612A), generates an alert notifying administrators or a user of the endpoint device (block 612B), and terminates and/or quarantines the suspicious process (block 612C). When the user mode agent determines that the protected file has not been encrypted by the suspicious process (no at block 614), the user mode agent generates an identifier of the application that caused the suspicious process to launch for use in future analysis (block 616).

Figure 7:
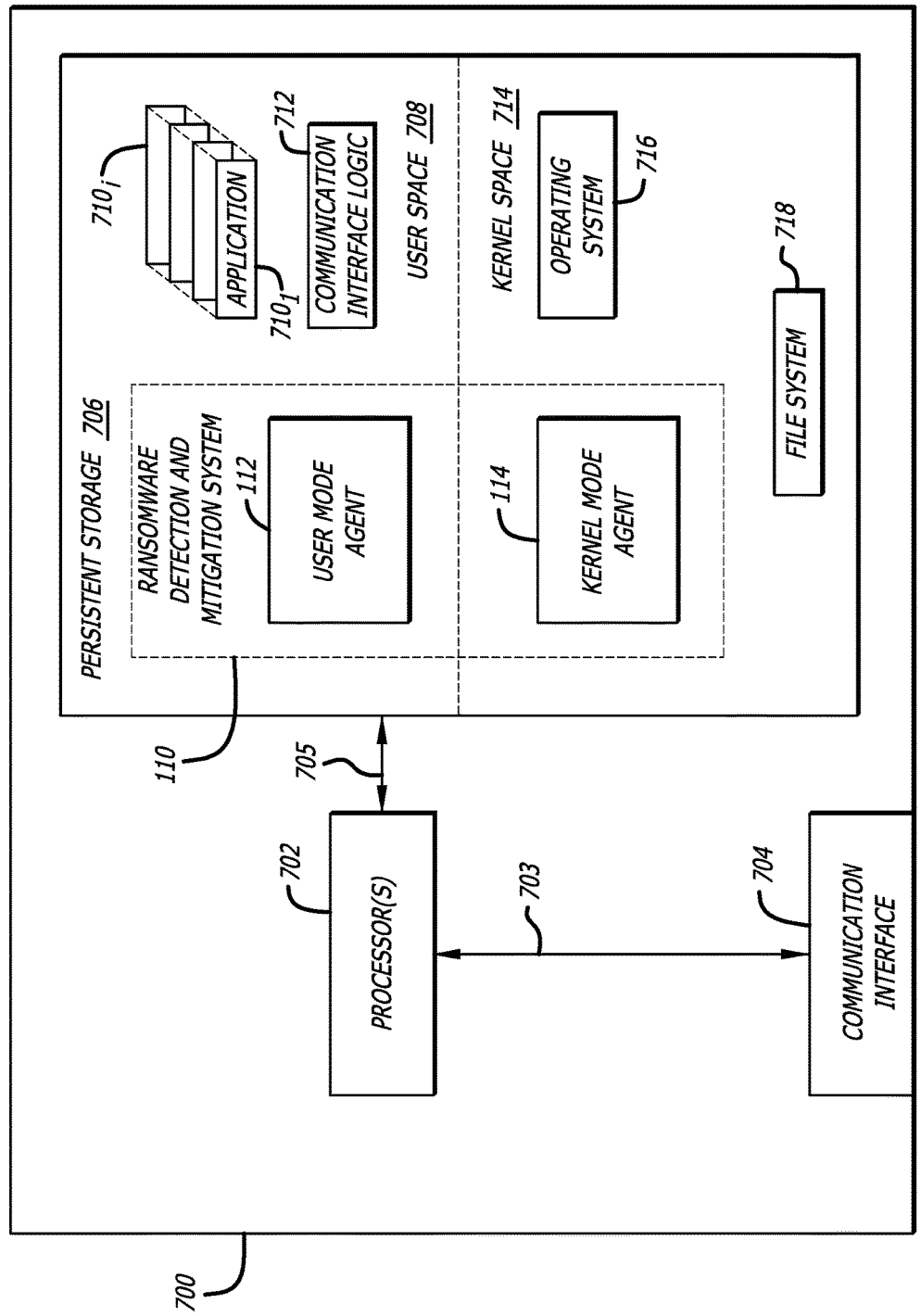
FIG. 7 is an exemplary embodiment of a logical representation of the ransomware detection and mitigation system 110 of FIGS. 1A-1B.

Now referring to FIG. 7, an exemplary embodiment of a logical representation of the ransomware detection and mitigation system 110 of FIGS. 1A-1B. The ransomware detection and mitigation system 110, in an embodiment may be stored on a non-transitory computer-readable storage medium of an endpoint device that includes a housing 700, which is made entirely or partially of a hardened material (e.g., hardened plastic, metal, glass, composite or any combination thereof) that protects the circuitry within the housing 700, namely one or more processors 702 that are coupled to a communication interface 705 via a first transmission medium 703. The communication interface 704, in combination with a communication logic 716, enables communications with external network devices and/or other network appliances to receive updates for the ransomware detection and mitigation system 110. According to one embodiment of the disclosure, the communication interface 704 may be implemented as a physical interface including one or more ports for wired connectors. Additionally, or in the alternative, the communication interface 704 may be implemented with one or more radio units for supporting wireless communications with other electronic devices. The communication interface logic 716 may include logic for performing operations of receiving and transmitting one or more objects via the communication interface 704 to enable communication between the generated ransomware detection and mitigation system 110 and network devices via the a network (e.g., the internet) and/or cloud computing services.

The processor(s) 702 is further coupled to a persistent storage 706 via a second transmission medium 705. According to one embodiment of the disclosure, the persistent storage 706 may include, (i) a user mode agent 112, one or more applications 710₁-710₁ and the communication interface logic 712 in a user space 708, and (ii) a kernel mode agent 114, an operating system 716 and a file system 718 in a kernel space 714. Of course, when implemented as hardware, one or more of these logic units could be implemented separately from each other.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computerized method for detecting and mitigating a ransomware attack on an endpoint device, the method comprising:

detecting, by a kernel mode agent, an initiation of a process;

determining, by the user mode agent, the process is a suspicious process;

intercepting, by the kernel mode agent, a first request by the suspicious process to open a protected file, wherein the suspicious process has write permissions;

prior to enabling the suspicious process to open the protected file, (i) responsive to determining a size of the protected file is greater than or equal to a predefined size threshold, generating a copy of a portion of the protected file less than an entirety of the protected file for storage at a secure storage location, and (ii) responsive to determining the size is less than the predefined size threshold, generating a copy of the entirety of the protected file for storage at the secure storage location;

intercepting, by the kernel mode agent, a second request by the suspicious process to close the protected file;

determining, by the user mode agent, whether the suspicious process is associated with the ransomware attack based on an analysis of the protected file; and responsive to determining the suspicious process is associated with the ransomware attack, generating, by the user mode agent, an alert notifying a user of the endpoint device.

2. The computerized method of claim 1, further comprising:

restoring, by the kernel mode agent, the protected file with the copy stored in the secure storage location when the suspicious process is determined to be associated with the ransomware attack.

3. The computerized method of claim 1, wherein the determining the process is the suspicious process includes:

performing a static analysis of the process by the user mode agent and assigning, by the user mode agent, a first score to a result of the static analysis;

determining, by the user mode agent, whether an executable file corresponding to the process was generated through data manipulation of a monitored process and assigning, by the user mode agent, a second score to a result of determining whether the executable file corresponding to the process was generated through data manipulation of the monitored process;

determining, by the user mode agent, whether the process is a non-system process being analyzed for a first time and assigning a third score to a result of determining whether the process is the non-system process being analyzed for the first time; and determining, by the user mode agent, the process is the suspicious process when at least one of the first score, the second score, or the third score are above a first predefined threshold, or a combination of the first score, the second score, or the third score is above a second predefined threshold.

4. The computerized method of claim 1, wherein the at least the portion of the protected file includes an entirety of the protected file.

5. The computerized method of claim 1, further comprising:

subsequent to generating the copy of at least the portion of the protected file, providing, by the kernel mode agent, the suspicious process having write permissions access to open the protected file, wherein the copy of at least the portion of the protected file is stored at the secure storage location.

6. The computerized method of claim 5, further comprising:

monitoring, by the user mode agent, operations performed by the suspicious process involving the protected file.

7. The computerized method of claim 1, wherein determining whether the suspicious process is associated with the ransomware attack includes:

a first determination by the user mode agent as to whether a result of an entropy calculation of the protected file by the kernel mode agent is greater than a predefined entropy threshold.

8. The computerized method of claim 7, wherein determining whether the suspicious process is associated with the ransomware attack further includes:
- a second determination by the user mode agent as to whether the protected file has been modified by the suspicious wherein the protected file is not accessible by a corresponding application.

9. The computerized method of claim 8, wherein determining whether the suspicious process is associated with the ransomware attack includes:
- a third determination by the user mode agent as to whether the protected file was encrypted by the kernel mode agent.

10. The computerized method of claim 1, further comprising:
- responsive to determining the suspicious process is associated with the ransomware attack, quarantining, by the user mode agent, a software application that caused the initiation of the suspicious process.

11. A non-transitory computer readable medium, when processed by a hardware processor, monitors processing of a process on an endpoint device and determines whether the process is associated with a ransomware attack, the non-transitory computer readable medium comprising:
- a kernel mode agent to intercept an initiation of a process, intercept one or more system calls made by the process when the process is determined to be suspicious and generate a copy of at least a portion of a protected file when a request to open a protected file by the process is intercepted when the process is determined to be suspicious, wherein the copy is stored at a secure storage location, and wherein (i) when a size of the protected file is greater than or equal to a predefined size threshold, the copy is less than an entirety of the protected file, and (ii) when the size of the protected file is less than the predefined size threshold, the copy is of an entirety of the protected file; and
- a user mode agent to determine whether the process is a suspicious process, monitor processing of the suspicious process, determine whether the suspicious process is associated with a cyber-attack, and generate an alert to notify a user of the endpoint device.

12. The non-transitory computer readable medium of claim 11, wherein determining whether the process is the suspicious process includes:
- performing a static analysis of the process by the user mode agent and assigning a first score to a result of static analysis;
- determining, by the user mode agent, whether an executable file corresponding to the process was generated through data manipulation of a monitored process and assigning a second score to a result of determining whether the executable file corresponding to the process was generated through data manipulation of the monitored process;
- determining, by the user mode agent, whether the process is a non-system process being analyzed for a first time and assigning a third score to determining whether the process is the non-system process being analyzed for the first time; and
- determining, by the user mode agent, the process is the suspicious process when at least one of the first score, the second score, or the third score are above a first predefined threshold, or a combination of the first score, the second score, or the third score is above a second predefined threshold.

13. The non-transitory computer readable medium of claim 11, wherein the kernel mode agent to permit the suspicious process to open the protected file with write permissions following generating the copy of at least the portion of the protected file, wherein the copy is stored at the secure storage location.

14. The non-transitory computer readable medium of claim 11, wherein the kernel mode agent to intercept a request by the suspicious process to close the protected file.

15. The non-transitory computer readable medium of claim 14, wherein the kernel mode agent to perform an entropy calculation on the protected file following interception of the request to close the protected file.

16. The non-transitory computer readable medium of claim 15, wherein the user mode agent to instruct the kernel mode agent to restore the protected file with the copy stored in the secure storage location when the suspicious process is associated with the ransomware attack.

17. The non-transitory computer readable medium of claim 11, wherein determining whether the suspicious process is associated with the ransomware attack includes:
- a first determination by the user mode agent as to whether a result of an entropy calculation of the protected file by the kernel mode agent is greater than a predefined entropy threshold.

18. The non-transitory computer readable medium of claim 17, wherein determining whether the suspicious process is associated with the ransomware attack further includes:
- a second determination by the user mode agent as to whether the protected file has been modified by the suspicious wherein the protected file is not accessible by a corresponding application; and
- a third determination by the user mode agent as to whether the protected file was encrypted by the kernel mode agent.

19. The non-transitory computer readable medium of claim 11, wherein the cyber-attack is a ransomware attack.

20. The non-transitory computer readable medium of claim 11, wherein responsive to determining the suspicious process is associated with the cyber-attack, the user mode agent to quarantine a software application that caused the initiation of the suspicious process.

21. A network device, comprising:
- a hardware processor; and
- a memory communicatively coupled to the hardware processor, the memory comprises:
  - (i) a kernel mode agent that, when executed by the processor, intercepts an initiation of a process, intercepts one or more system calls made by the process when the process is determined to be suspicious and generates a copy of at least a portion of a protected file when a request to open a protected file by the process is intercepted when the process is determined to be suspicious, wherein the copy is stored at a secure storage location, and wherein (i) when a size of the protected file is greater than or equal to a predefined size threshold, the copy is less than an entirety of the protected file, and (ii) when the size of the protected file is less than the predefined size threshold, the copy is of an entirety of the protected file; and
  - (ii) a user mode agent that, when executed by the processor, determines whether the process is a suspicious process, monitors processing of the suspicious process, determines whether the suspicious process is associated with a ransomware attack and responsive to determining the suspicious process is associated with the ransomware attack, generates an alert to notify a user of the network device.

\* \* \* \* \*